(12) United States Patent  (10) Patent No.: US 7,209,183 B2
Kim  (45) Date of Patent: Apr. 24, 2007

(54) METHOD OF AUTOMATICALLY SETTING IMAGE QUALITY

(75) Inventor: Hyun-joon Kim, Gyeonggi-do (KR)

(73) Assignee: Samsung Electronics Co., Ltd., Gyeonngi-do (KR)

( * ) Notice: Subject to any disclaimer, the term of this patent is extended or adjusted under 35 U.S.C. 154(b) by 472 days.

(21) Appl. No.: 10/880,374

(22) Filed: Jun. 30, 2004

(65) Prior Publication Data

US 2005/0030431 A1  Feb. 10, 2005

(30) Foreign Application Priority Data

Jun. 30, 2003  (KR) ...................... 10-2003-0043572

(51) Int. Cl.
 *H04N 5/57* (2006.01)
 *H04N 5/52* (2006.01)
(52) U.S. Cl. ...................... 348/678; 348/673; 348/687; 382/274
(58) Field of Classification Search ................ 348/673, 348/678, 687, 625, 686, 252; 382/274, 254; 358/3.27, 532, 447; 345/690, 77, 63
See application file for complete search history.

(56) References Cited

U.S. PATENT DOCUMENTS

| | | | | |
|---|---|---|---|---|
| 3,622,696 A | * | 11/1971 | Macintyre, Jr. ............. 348/602 |
| 3,641,268 A | * | 2/1972 | Beck ........................... 348/625 |
| 4,126,884 A | * | 11/1978 | Shanley, II ................. 348/380 |
| 4,511,921 A | * | 4/1985 | Harlan et al. ............... 348/602 |
| 4,599,641 A | * | 7/1986 | Troiano ....................... 348/673 |
| 4,679,087 A | * | 7/1987 | Torrano et al. ............. 348/673 |
| 4,682,231 A | * | 7/1987 | Yamakawa .................. 348/673 |
| 4,979,044 A | * | 12/1990 | Hong .......................... 348/380 |
| 4,980,756 A | * | 12/1990 | Lagoni ........................ 348/675 |
| 4,982,287 A | * | 1/1991 | Lagoni ........................ 348/673 |
| 4,989,074 A | * | 1/1991 | Matsumoto ................. 348/572 |
| 5,003,394 A | * | 3/1991 | Lagoni ........................ 348/673 |
| 5,021,885 A | * | 6/1991 | Kim ............................ 348/380 |
| 5,191,420 A | * | 3/1993 | Lagoni et al. .............. 348/687 |
| 5,200,829 A | * | 4/1993 | Lagoni ........................ 348/380 |
| 5,225,903 A | * | 7/1993 | Wittrin ........................ 348/164 |
| 5,282,063 A | * | 1/1994 | Deacon et al. ............. 358/479 |
| 5,396,300 A | * | 3/1995 | Kageyama .................. 348/678 |
| 5,406,336 A | * | 4/1995 | Harlos et al. ............... 348/673 |
| 5,504,538 A | * | 4/1996 | Tsujihara et al. ........... 348/673 |
| 5,546,134 A | * | 8/1996 | Lee .............................. 348/673 |
| 5,596,375 A | * | 1/1997 | Kwon ......................... 348/687 |

(Continued)

*Primary Examiner*—David Ometz
*Assistant Examiner*—Jean W. Désir
(74) *Attorney, Agent, or Firm*—Sughrue Mion, PLLC

(57) ABSTRACT

Provided is a method of automatically setting image quality, which maintains a brightness and a contrast of an image regardless of a status of an input signal. The method includes: (a) setting a variable range of brightness and a variable range of contrast; (b) converting a brightness signal included in an input video signal into a digital signal and recording the digital brightness signal in a plurality of registers according to brightness level; (c) changing a brightness value or a contrast value of an output video signal by comparing values of a first register, second register, third register, and fourth register among the registers to predetermined values; and (d) if the changed brightness value is in the variable range of the brightness and the contrast value is in the variable range of the contrast, determining that the compensation of image quality is complete, and returning to step (b).

4 Claims, 5 Drawing Sheets

U.S. PATENT DOCUMENTS

| | | | |
|---|---|---|---|
| 5,675,391 A * | 10/1997 | Yamaguchi et al. | 348/565 |
| 5,712,659 A * | 1/1998 | Adachi | 345/617 |
| 5,760,843 A * | 6/1998 | Morimura et al. | 348/678 |
| 5,930,402 A * | 7/1999 | Kim | 382/274 |
| 5,933,130 A * | 8/1999 | Wagner | 345/690 |
| 5,959,696 A * | 9/1999 | Hwang | 348/678 |
| 6,002,445 A * | 12/1999 | Urayama | 348/572 |
| 6,459,458 B1 * | 10/2002 | Balaban | 348/678 |
| 6,542,202 B2 * | 4/2003 | Takeda et al. | 348/678 |
| 6,671,001 B2 * | 12/2003 | Lin | 348/679 |
| 6,678,010 B2 * | 1/2004 | Jun | 348/678 |
| 6,762,800 B1 * | 7/2004 | Nie et al. | 348/687 |
| 6,900,830 B2 * | 5/2005 | Okabe | 348/173 |
| 7,050,114 B2 * | 5/2006 | Stessen et al. | 348/679 |
| 7,093,941 B2 * | 8/2006 | Kawashima et al. | 353/97 |
| 7,102,695 B2 * | 9/2006 | Han et al. | 348/673 |
| 7,113,227 B1 * | 9/2006 | Kakuya et al. | 348/678 |
| 2003/0146919 A1 * | 8/2003 | Kawashima et al. | 345/609 |

* cited by examiner

METHOD OF AUTOMATICALLY SETTING IMAGE QUALITY

BACKGROUND OF THE INVENTION

This application claims the priority of Korean Patent Application No. 2003-43572, filed on Jun. 30, 2003, in the Korean Intellectual Property Office, the disclosure of which is incorporated herein in its entirety by reference.

1. Field of the Invention

The present invention relates to a display method, and more particularly, to a method of automatically setting image quality such that brightness (that is, a cut off point) and contrast (that is, a saturation point) of an actual image are maintained at a constant level regardless of a status of an input signal.

2. Description of the Related Art

In a conventional auto gain control (AGC) method, which processes an input video signal after converting a level of the input video signal that exceeds a reference value, the video signal is compensated for based on a sync level, which is combined with the video signal before being input. Therefore, it is difficult to exactly compensate for the brightness of an actual image. Also, a malfunction of a device performing the AGC process may occur, during which the AGC process cannot exactly compensate for the signal level.

Image quality of a broadcast signal and images received from video tapes may be different from each other. Also, image quality of a video signal and of a digital versatile disc (DVD) signal, which are connected to a same DVD player, may be different from each other. Most users usually watch the images as they are. However, some users adjust the brightness and contrast of the image by accessing a user menu. However, the adjustments should be made automatically when the channel is changed or input source is changed.

FIGS. 1A and 1B are flow charts illustrating a conventional method for setting image quality.

Referring to FIG. 1A, a brightness signal included with an input video signal is converted into an 8-bit digital signal (step 100). The digital brightness signal is stored in one of a register 50h through a register 6Fh according to a brightness level (step 101). The digital brightness signal is input to a scaler (not shown). The upper 4 bits of the 8-bit digital brightness signal are divided into 16 levels according to the brightness level, and resultant values of the division are stored in register 51h through register 6Fh in 2-byte units. That is, the darkest digital brightness signal is stored in register 50h and register 51h, and the brightest digital brightness signal is stored in register 6Dh and register 6Fh.

Values of registers 51h/53h/6Dh/6Fh, which are the registers that compensate image quality, are read to determine whether the values of the registers 51h/53h/6Dh/6Fh are 0x00/0xHH/0xHH/0x00 (steps 102 and 103). Here, 0xHH does not refer to a specific value, but satisfies 0xHH≠0x00.

When the values of registers 51h/53h/6Dh/6Fh are 0x00/0xHH/0xHH/0x00, it is determined that the image quality is set to be optimal, and corresponding brightness and contrast values are stored in memory (step 104).

When the values of registers 51h/53h are 0x00/0x00, the brightness value of an output video signal is decreased by one level (steps 105 and 106).

However, when the values of registers 51h/53h are 0xHH/0xHH, the brightness value of the output video signal is increased by one level (steps 107 and 108).

In addition, when the values of registers 6Dh/6Fh are 0x00/0x00, the contrast value of the output video signal is increased by one level (steps 109 and 110).

However, when the values of registers 6Dh/6Fh are 0xHH/0xHH, the contrast value of the output video signal is decreased by one level (steps 111 and 112).

As described above, the brightness/contrast may be changed excessively depending on the status of the image when a cut off level and a saturation level are compensated for by changing the brightness/contrast according to conventional methods, thus a method of preventing this is required.

For example, when it is assumed that a night scene is displayed, the dark scene may be displayed too brightly such that a viewer cannot determine whether the scene is a night scene or a day scene, by increasing the contrast to a high level. In this case, there is a need to prevent the contrast from increasing beyond a certain maximum point, to represent the night scene appropriately.

SUMMARY OF THE INVENTION

The present invention provides a method of automatically setting image quality such that brightness and contrast of an actual image are maintained at a constant level regardless of the state of an input signal.

According to an aspect of the present invention, there is provided a method for setting an image quality automatically including: (a) setting a variable range of a brightness and a variable range of a contrast; (b) converting a brightness signal included in an input video signal into a digital signal and recording the digital brightness signal in a plurality of registers according to brightness level; (c) changing a brightness value or a contrast value of an output video signal by comparing values of a first register, a second register, a third register, and a fourth register among the registers to predetermined values; and (d) if the changed brightness value is in the variable range of the brightness and the contrast value is in the variable range of the contrast, determining that the compensation of image quality is complete, and returning to step (b).

If the values of a fifth register and a sixth register among the registers contain predetermined values, the image may be determined to be a full-white or a full-black image and the image quality compensating operation may be skipped.

In step (c), if the values stored in the first, second, third, and fourth registers are not equal to the predetermined values, the method may include: (c-1) increasing the brightness value of the output video signal by one level, when the values of the first and second registers are a first predetermined value; (c-2) decreasing the brightness value of the output video signal by one level, when the values of the first and second registers are a second predetermined value; (c-3) decreasing the contrast value of the output video signal by one level, when the values of the third and fourth registers are a third predetermined value; and (c-4) increasing the contrast value of the output video signal by one level, when the values of the third and fourth registers are a fourth predetermined value.

If the changed brightness is determined not to be in the variable range of the brightness, the brightness may be restored to an initial brightness value, and, if the changed contrast is determined not to be in the variable range of the contrast, the contrast may be returned to an initial contrast value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to accompanying drawings.

Figure 1A:
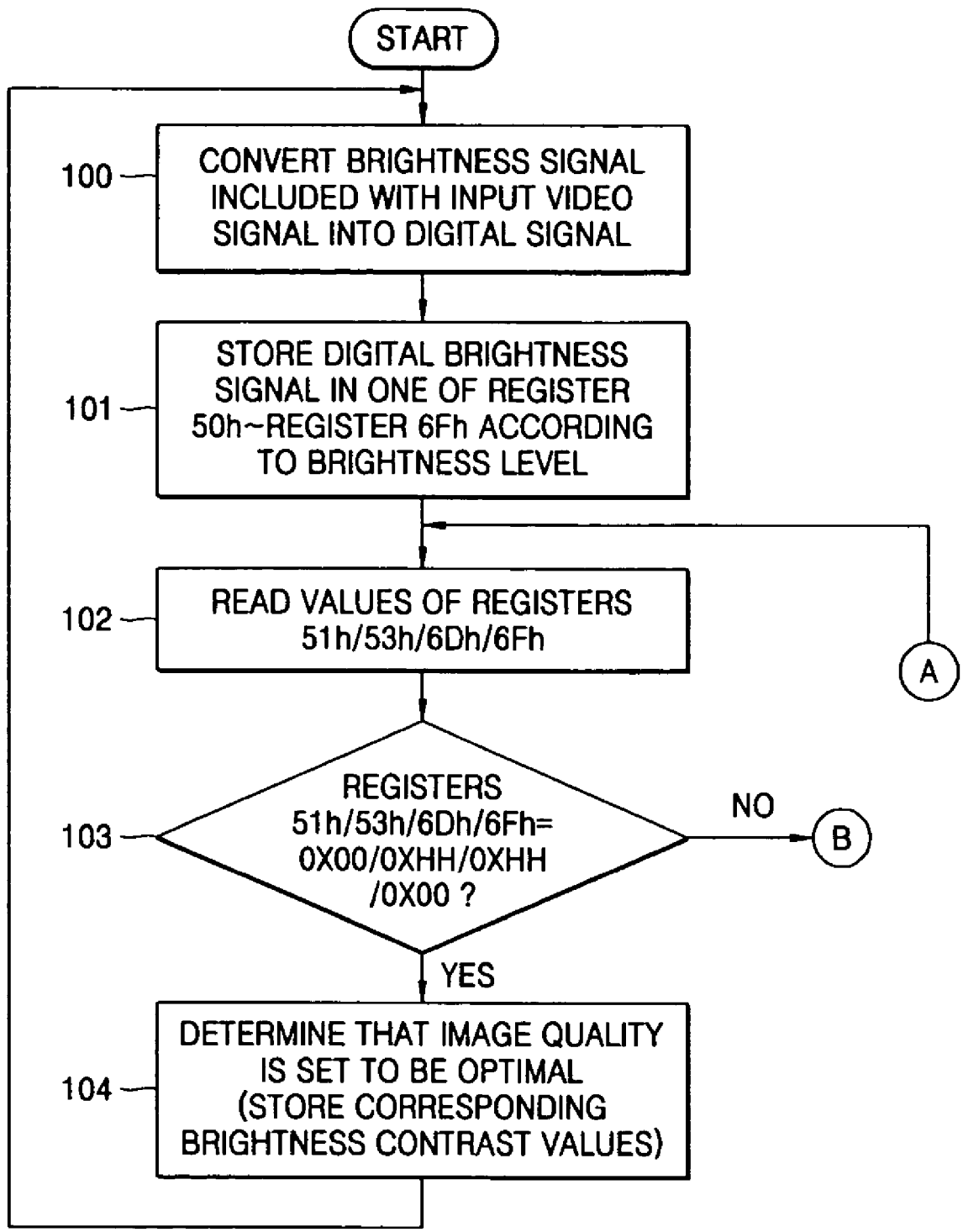
FIGS. 1A and 1B are flow charts illustrating a conventional method for setting image quality.
Figure 1B:
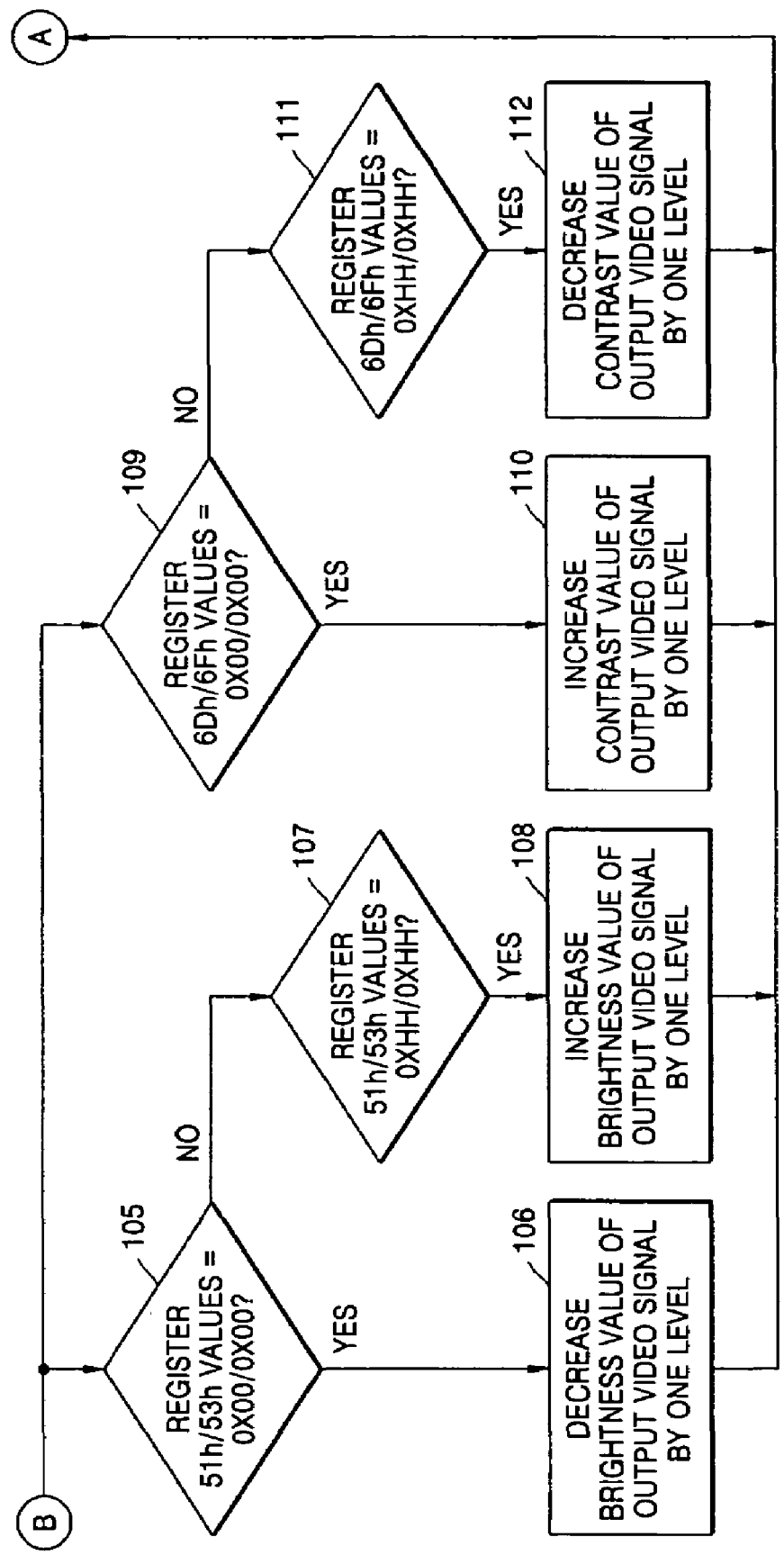
Figure 2:
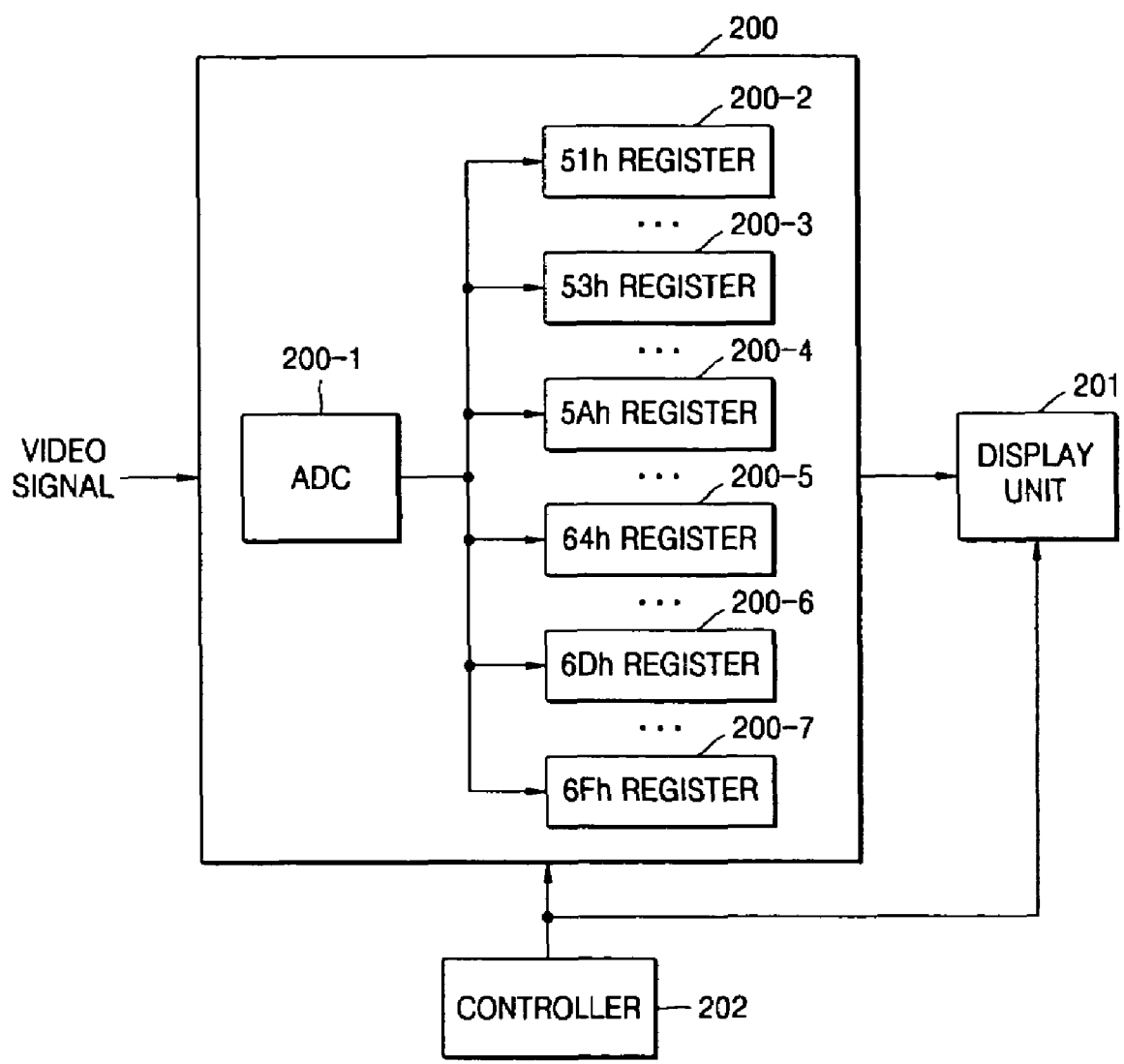
FIG. 2 is a block diagram of an apparatus that automatically sets image quality.

FIG. 2 is a block diagram of an apparatus that automatically sets image quality. The apparatus includes a scaler 200, which scales an input video signal such that the video signal is adjusted for a display specification, a display unit 201, which displays the scaled signal, and a controller 202, which controls the scaler 200 and the display unit 201. The scaler 200 includes an analog-to-digital converter (ADC) 200-1, which converts the input video signal into a digital signal, and registers 51h (200-2) through 6Fh (200-7), which store a digital brightness signal included in a video signal. The scaler 200 further includes an up/down counter (not shown), which increases/decreases the brightness value or contrast value of the input video signal by one level in response to the controller 202.

Figure 3A:
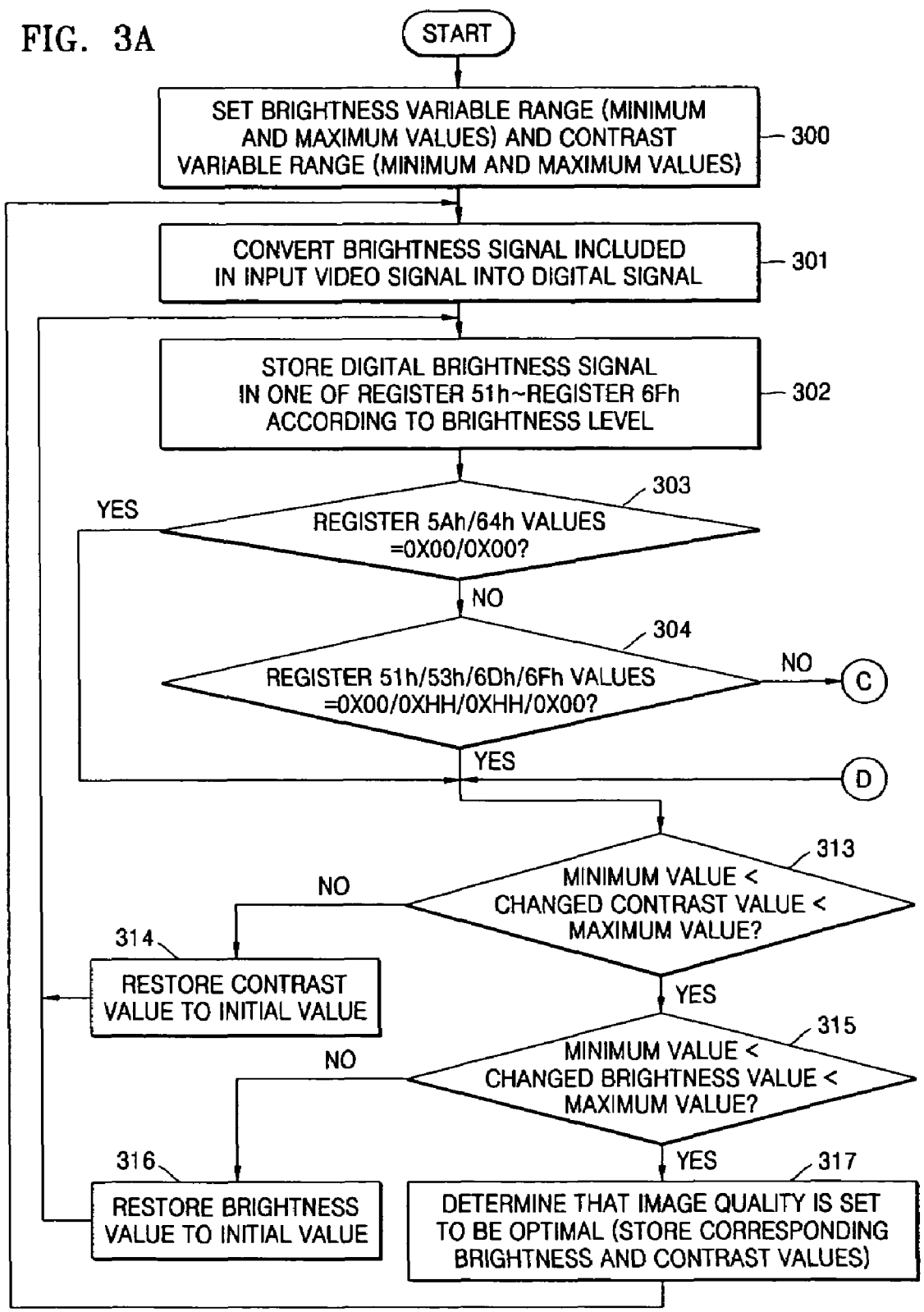
FIGS. 3A and 3B are flow charts illustrating a method of automatically setting the image quality according to a first embodiment of the present invention.
Figure 3B:
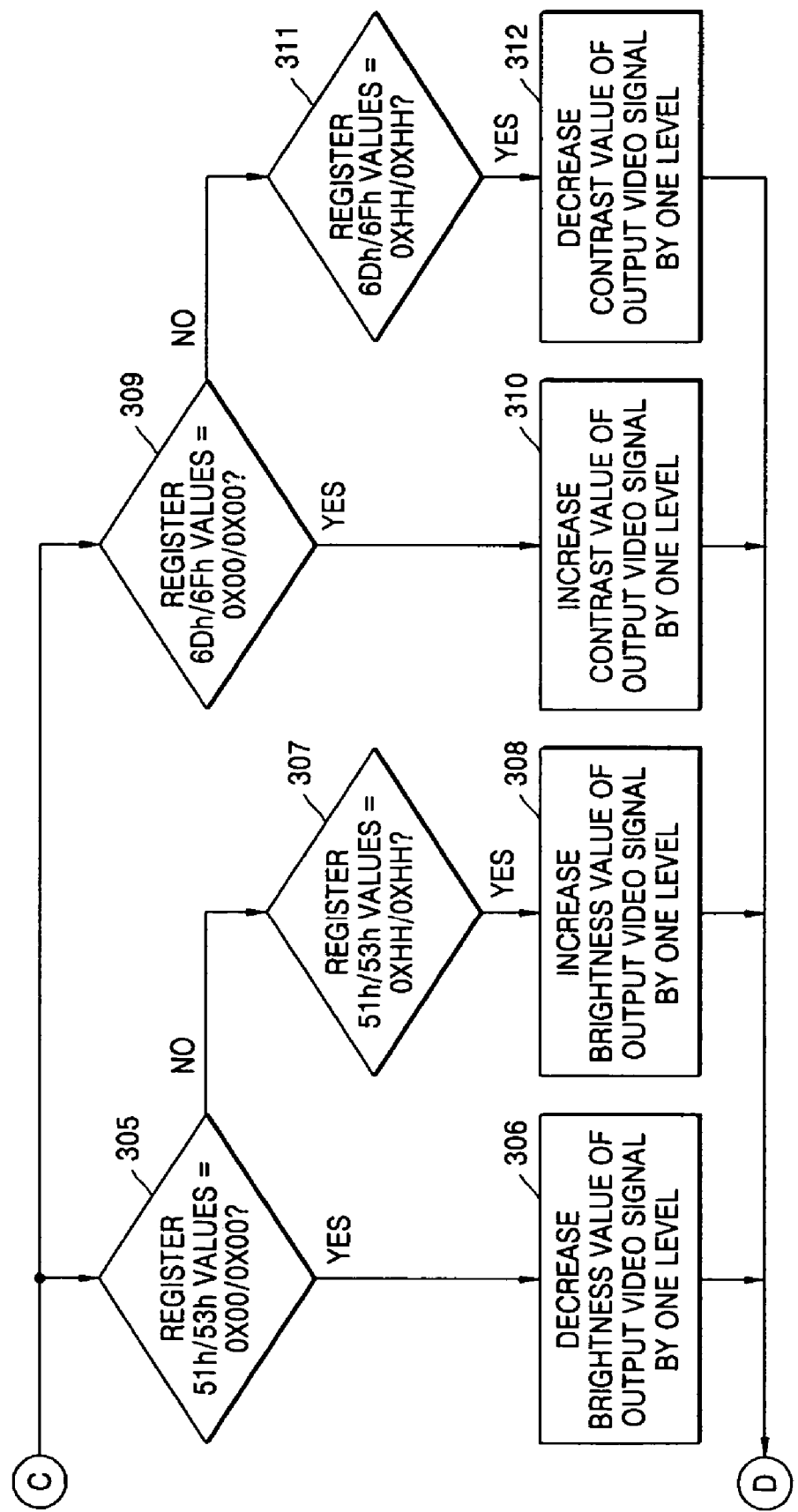

FIGS. 3A and 3B are a flow chart illustrating a method of automatically setting image quality according to a first embodiment of the present invention. The method of setting the image quality automatically includes setting variable ranges of the brightness and the contrast (step 300), converting the brightness signal included in the input video signal into the digital signal (step 301), storing the digital brightness signal in one of the registers 51h through 6Fh according to the brightness level of the digital brightness signal (step 302), determining whether the values of registers 5Ah/64h are 0x00/0x00 (step 303), determining whether the values of registers 51h/53h/6Dh/6Fh are 0x00/0xHH/0xHH/0x00 (step 304), determining whether the values of registers 51h/53h are 0x00/0x00 (step 305), decreasing a brightness value of an output video signal by one level (step 306), determining whether the values of registers 51h/53h are 0xHH/0xHH (step 307), increasing a brightness value of the output video signal by one level (step 308), determining whether the values of registers 6Dh/6Fh are 0x00/0x00 (step 309), increasing contrast value of the output video signal by one level (step 310), determining whether the values of registers 6Dh/6Fh are 0xHH/0xHH (step 311), decreasing the contrast value of the output video signal by one level (step 312), determining whether the changed contrast value is between a first minimum value and a first maximum value (step 313), restoring the contrast value to the initial value of the contrast value (step 314), determining whether the changed brightness value is between a second minimum value and a second maximum value (step 315), restoring the brightness value to the initial value of the brightness value (step 316), and determining that the image quality is optimally set (step 317).

The method for setting the image quality automatically will now be described in more detail with reference to FIGS. 2, 3A and 3B.

The controller 202 sets variable ranges of the brightness and the contrast, which will be used when compensating for the image quality (step 300), by setting first and second minimum values (Min.) and first and second maximum values (Max.) of the brightness and the contrast. Table 1 shows the variable ranges of the brightness and the contrast set by the controller 202.

TABLE 1

| | Brightness | | | Contrast | | |
|---|---|---|---|---|---|---|
| | Min. | Default value | Max. | Min. | Default value | Max. |
| | fac. save 0 x 00~0 x 2A | 0 x 2B | fac. save 0 x 2C~0 x 3F | fac. save 0 x 50~0 x 6F | 0 x 70 | fac. save 0 x 71~0 x 9F |

The controller 202 controls the scaling operation of the scaler 200 and the display operation of the display unit 201 to compensate the image quality.

The input video signal may be a video signal received via an antenna (not shown), or may be a video signal input from an external device such as a digital versatile disc (DVD) player or a set top box (STB).

The input video signal is input to the scaler 200, and the scaler 200 scales the input video signal such that the video signal is adjusted for the specification of the display unit 201.

The ADC 200-1 of the scaler 200 converts the input video signal into an 8-bit digital signal (step 301). The input video signal includes a color signal and a brightness signal, and the ADC 200-1 converts the color signal and the brightness signal into the digital signal. The digital brightness signal is used to compensate the image quality.

The scaler 200 stores the digital brightness signal received from the ADC 200-1 in one of the register 51h 200-2 through register 6Fh 200-7 according to the brightness level. The upper 4 bits of the 8-bit digital brightness signal are divided into 16 levels according to the brightness level, and the divided signals are stored in the register 51h 200-2 through register 6Fh 200-7 in 2-byte units (step 302). The scaler 200 includes register 51h 200-2 through register 6Fh 200-7 to compensate the image quality. The darkest digital brightness signal is stored in the 51h register 200-2, and a brighter digital signal than the digital signal stored in the register 51h 200-2 is stored in the register 52h (not shown). The digital brightness signals are stored in the registers, such that brightness signals at higher levels are stored in higher register and the brightest signal is stored in the register 6Fh 200-7.

The controller 202 determines whether the values stored in the register 5Ah 200-4 and the register 64h 200-5 are both 0x00(step 303). When a channel is changed or an input source is changed, the values of the register 5Ah 200-4 and the register 64h 200-5 are set to be 0x00. When the values of the register 5Ah 200-4 and the register 64h 200-5 represent full-black or full-white (0x00/0x00) due to a change of the channel or the input source, the image quality compensating operation is skipped.

However, if the values of the register 5Ah 200-4 and the register 64h 200-5 are not both 0x00, the controller 202 determines that the values of the registers 51h/53h/6Dh/6Fh 200-2, 200-3, 200-6, and 200-7 are predetermined values 0x00, 0xHH, 0xHH, and 0x00, respectively (step 304). Here, the value 0xHH does not mean a certain number, but means the values besides 0x00. In a case where the values of registers 51h/53h/6Dh/6Fh (200-2, 200-3, 200-6, and 200-7) are 0x00, 0xHH, 0xHH, and 0x00, and step 313 is performed.

However, when the values of registers 51h/53h/6Dh/6Fh (200-2, 200-3, 200-6, and 200-7) are not 0x00, 0xHH, 0xHH, and 0x00, respectively, the controller 202 determines whether the values of registers 51h/53h (200-2 and 200-3) are both 0x00, which are first certain values (step 305).

If the values of the registers 51h/53h (200-2 and 200-3) are both 0x00, the controller 202 decreases the brightness value of an output video signal by one level (step 306). The controller 202 commands the scaler 200 to decrease the brightness value of the output video signal by one level.

If the values of the registers 51h (200-2) and 53h (200-3) are not determined to both be 0x00 in step 305, the controller 202 determines whether the values of the registers 51h/53h (200-2 and 200-3) are both 0xHH, which are second certain values (step 307).

If the values of the registers 51h/53h (200-2 and 200-3) are both 0xHH, the controller 202 increases the brightness value of the output video signal by one level (step 308). The controller 202 commands the scaler 200 to increase the brightness value of the output video signal by one level.

However, if the values of the registers 51h/53h (200-2 and 200-3) are not both 0x00, or 0xHH, then step 313 is performed.

When the values of the registers 51h/53h/6Dh/6Fh (200-2, 200-3, 200-6 and 200-7) are not 0x00, 0xHH, 0xHH, and 0x00 respectively, the controller 202 determines whether the values of the registers 6Dh/6Fh (200-6 and 200-7) are both 0x00, that is, third certain values (step 309).

If the values of the registers 6Dh/6Fh (200-6 and 200-7) are both 0x00, the controller 202 increases the contrast value of the output video signal by one level (step 310). The controller 202 commands the scaler 200 to increase the contrast value of the output video signal by one level.

If the values of the registers 60h (200-6) and 6Fh (200-7) are not both 0x00 in step 310, the controller 202 determines whether the values of the registers 6Dh/6Fh (200-6 and 200-7) are both 0xHH, which are fourth certain values (step 311).

If the values of the registers 6Dh/6Fh (200-6 and 200-7) are both 0xHH, then the controller 202 decreases the contrast value of the output video signal by one level (step 312). The controller 202 commands the scaler 200 to decrease the contrast of the output video signal by one level.

However, if the values of the registers 6Dh/6Fh (200-6 and 200-7) are not both 0x00, or 0xHH, step 313 is performed.

Then, the controller 202 determines whether that the changed contrast value is between the first minimum value and the first maximum value set in step 300 (step 313). In step 300, the controller 202 sets the variable range of the contrast value between the minimum value and the maximum value.

If the changed contrast value is not between the first minimum and maximum values, the controller 202 restores the output video signal to the initial value of the contrast value, and performs step 301 (step 314).

If the contrast value is determined to be between the first minimum value and first maximum value in step 313, the controller 202 determines whether the changed brightness value is between the minimum value and the second maximum value set in step 300 (step 315). In step 300, the controller 202 sets the variable range of the brightness value having the minimum value and the maximum value so that the brightness can be changed within the variable range.

If the changed brightness value is not between the second minimum and maximum values, the controller 202 restores the output video signal to the initial value of the brightness value, and performs step 301 (step 316).

If the contrast values and the brightness values of the registers 51h/53h/6Dh/6Fh (200-2, 200-3, 200-6 and 200-7) are between the first and second minimum and maximum values, respectively, the controller 202 determines that the optimal image quality is set, and stores the corresponding brightness and contrast values (step 317).

As described above, according to exemplary embodiments of the present invention, variable ranges of the brightness and the contrast are set according to the image status to prevent the brightness and the contrast from changing greatly when changing the channel, changing the input source, or changing the screen mode. Also, the brightness and contrast are not changed when a full-white pattern or a full-black pattern is displayed, thus, preventing the image quality from changing excessively.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of setting an image quality automatically comprising:
    (a) setting a variable range of a brightness and a variable range of a contrast;
    (b) converting a brightness signal included in an input video signal into a digital brightness signal and recording the digital brightness signal in a plurality of registers according to brightness level;
    (c) changing a brightness value or a contrast value of an output video signal by comparing values of a first register, a second register, a third register, and a fourth register among the plurality of registers to predetermined values; and
    (d) if the changed brightness value is in the variable range of the brightness and the contrast value is in the variable range of the contrast, determining that the setting of image quality is complete, and returning to step (b).

2. The method of claim 1, wherein if the values of a fifth register and a sixth register among the plurality of registers contain predetermined values, the image is determined to be a full-white or a full-black image and the image quality setting operation is skipped.

3. The method of claim 1, wherein, in step (c), if the values stored in the first, second, third, and fourth registers are not equal to the predetermined values, step (c) comprises:
- (c-1) increasing the brightness value of the output video signal by one level, when the values of the first and second registers are a first predetermined value;
- (c-2) decreasing the brightness value of the output video signal by one level, when the values of the first and second registers are a second predetermined value;
- (c-3) decreasing the contrast value of the output video signal by one level, when the values of the third and fourth registers are a third predetermined value; and
- (c-4) increasing the contrast value of the output video signal by one level, when the values of the third and fourth registers are a fourth predetermined value.

4. The method of claim 1, wherein if the changed brightness value is determined not to be in the variable range of the brightness, the changed brightness value is restored to an initial brightness value, and, if the changed contrast value is determined not to be in the variable range of the contrast, the changed contrast value is returned to an initial contrast value.

* * * * *